(12) United States Patent
Virtanen et al.

(10) Patent No.: US 7,388,848 B2
(45) Date of Patent: Jun. 17, 2008

(54) METHOD AND APPARATUS FOR TRANSPORT FORMAT SIGNALING WITH HARQ

(75) Inventors: Anu Virtanen, Espoo (FI); Esa Malkamäki, Espoo (FI)

(73) Assignee: Spyder Navigations L.L.C., Wilmington, DE (US)

( * ) Notice: Subject to any disclaimer, the term of this patent is extended or adjusted under 35 U.S.C. 154(b) by 698 days.

(21) Appl. No.: 10/811,229

(22) Filed: Mar. 26, 2004

(65) Prior Publication Data

US 2005/0213536 A1   Sep. 29, 2005

(51) Int. Cl.
*H04Q 7/38* (2006.01)

(52) U.S. Cl. .................. 370/329; 370/341; 370/347; 370/349

(58) Field of Classification Search .............. 370/320, 370/335, 342, 441, 473, 469, 496, 231–235, 370/328, 329, 437, 310, 310.1, 321, 322, 370/345, 347, 349
See application file for complete search history.

(56) References Cited

U.S. PATENT DOCUMENTS

| | | | | |
|---|---|---|---|---|
| 7,168,015 B2* | 1/2007 | Ishida | .......................... | 714/712 |
| 2002/0064140 A1* | 5/2002 | Numminen | .................. | 370/311 |
| 2003/0039270 A1 | 2/2003 | Chang et al. | | |
| 2004/0117860 A1* | 6/2004 | Yi et al. | ....................... | 725/147 |
| 2005/0003782 A1* | 1/2005 | Wintzell | .................... | 455/226.3 |
| 2005/0013263 A1 | 1/2005 | Kim et al. | | |
| 2005/0053035 A1 | 3/2005 | Kwak et al. | | |
| 2005/0120097 A1* | 6/2005 | Walton et al. | ............... | 709/220 |
| 2005/0170830 A1* | 8/2005 | Pedersen et al. | .......... | 455/432.1 |
| 2006/0251191 A1* | 11/2006 | Willenegger | ................. | 375/341 |

FOREIGN PATENT DOCUMENTS

EP           134318 A2     9/2003

* cited by examiner

*Primary Examiner*—Jean A Gelin

(57) ABSTRACT

The invention provides a method and apparatus for providing signaling in a communication link to a sending node and a receiving node using the hybrid automatic repeat request (HARQ) protocol. The invention is characterized by the fact that the signalling contains a predetermined bit pattern that indicates whether control information in the current transmission can be used alone for decoding, or whether some part of the control information from an earlier transmission must also be used. The basic idea is to inform only with one bit ('TFCI flag'), whether the TFCI bits can be used for decoding the transport channel, using HARQ. If this bit is logical "1", then it means that current TFCI can be used for decoding, i.e. that the number of information bits for this transport format equals the number that is defined also originally when TFCI has been defined. Alternatively, if this one bit is logical "0", then it means that the receiving side has to assume the same number of information bits for this transport format as in the original transmission. Thus the number of information bits cannot be taken from the TFCI, when doing the decoding. Thus, typically, in the original transmission, the bit is logical "1", in the retransmissions the bit is either logical "0" or "1".

57 Claims, 3 Drawing Sheets

Uplink Dedicated Channel Structure

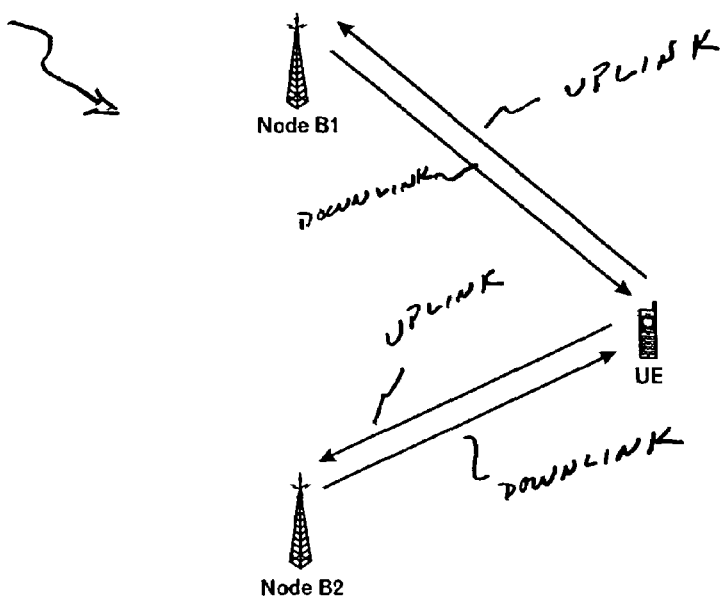
Figure 1A
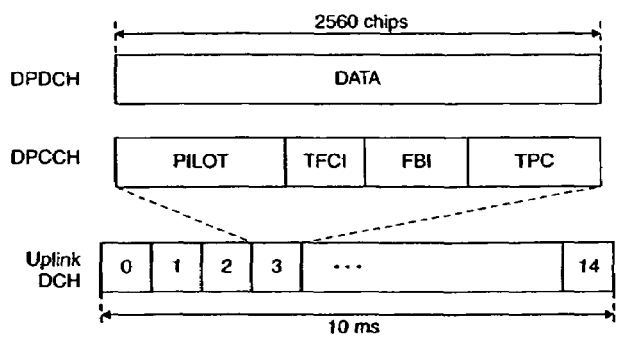
Figure 1B: Uplink Dedicated Channel Structure

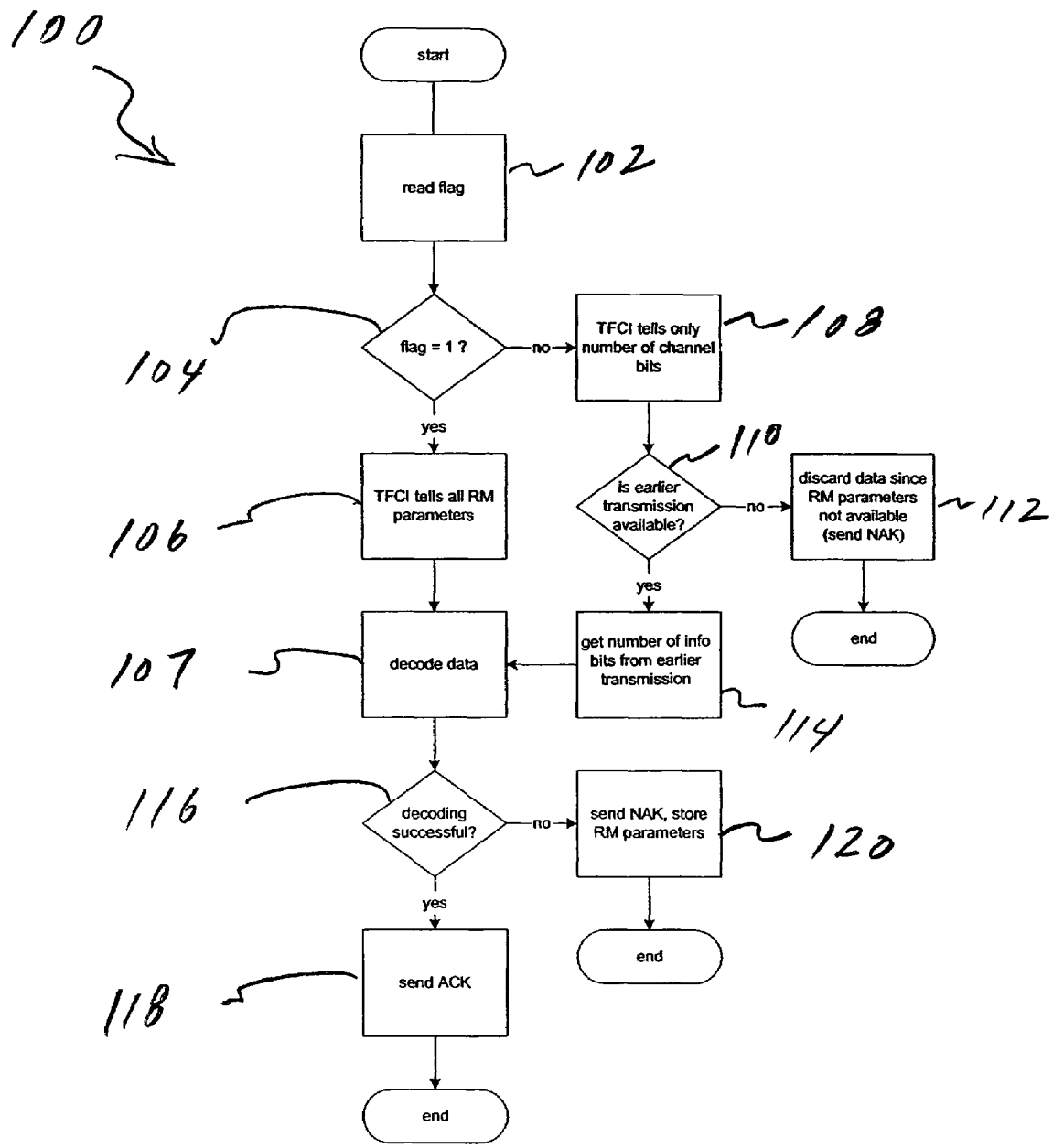
Figure 2: Flowchart of Transport Format Signalling

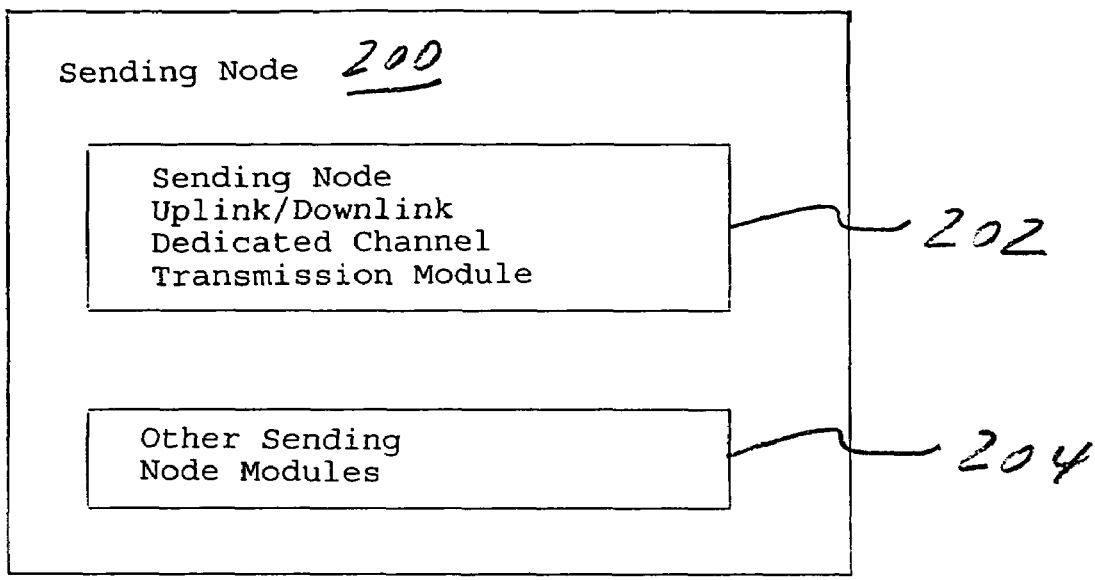
Figure 3: Sending Node
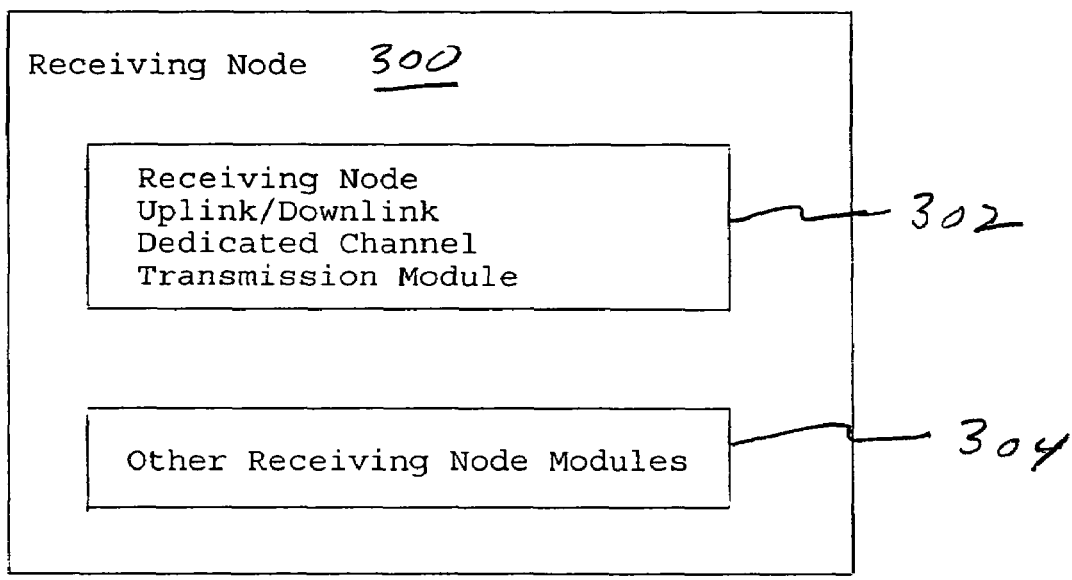
Figure 4: Receiving Node

METHOD AND APPARATUS FOR TRANSPORT FORMAT SIGNALING WITH HARQ

BACKGROUND OF THE INVENTION

1. Field of Invention

The present invention relates to a method and apparatus for providing L1 signalling to support the known hybrid automatic repeat request (HARQ) protocol (L1 retransmissions) in an uplink from user equipment (UE) to a receiving node for operating in a wireless network such as, for example, a third generation partnership project (3GPP) wireless network.

2. Description of Related Art

FIG. 1A shows the UE communicating with one or more receiving nodes, such as nodes B1, B2 (e.g. base stations), via an uplink and a downlink in a third generation partnership project (3GPP) wireless network generally indicated as 10. The UE communicates with the receiving nodes B1, B2 via a dedicated channel (DCH), which is also known as an uplink DCH that includes a dedicated physical data channel (DPDCH) and a dedicated physical control channel (DPCCH) for transporting packet data, as shown by way of example in FIG. 1B.

In FIG. 1B, the known uplink DCH structure has 15 slots over a 10 millisecond (ms) radio frame. Each slot, e.g. slot 3, of the physical control channel (DPCCH) includes a pilot field (PILOT), a transport format combination indicator (TFCI) field, a feedback information bits field (FBI) and a transmission power control (TPC) field. Typically, the physical control channel (DPCCH) is transmitted continuously and rate information is sent with the TFCI, which includes information on the data rate of the current DPDCH frame, which includes the packet data in the form of 2560 chips as shown.

As an enhancement for the uplink transmission, a physical/MAC layer retransmission mechanism has been proposed. The idea is that the receiving Node B would acknowledge the correctly received blocks (send ACK) and request retransmission of the incorrectly received blocks (send NAK) and the transmitting UE would retransmit the requested blocks. Furthermore, a hybrid ARQ protocol with soft combining of the (re)transmitted blocks has been proposed. Soft combining of the blocks (first transmission and retransmissions) requires that the information bits of the combined blocks are the same. The channel coded bits (i.e., the bits actually sent in the channel) of the first and retransmissions can be different (e.g., the code words could be punctured in a different way).

However, there is a problem in the art if during an uplink transmission the number of channel bits changes between a previous or earlier transmission and a new transmission. In this case, the currently used TFCI, which tells the transport format for known rel99 transport channels, is not giving enough information. This is because the TFCI currently assumes that there is always a fixed mapping between a certain number of information bits to a certain number of channel bits, when using the current rules from the specifications.

In the prior art, the TFCI is an index to a transport format combination set (TFCS) which includes all the possible/allowed transport format combinations (TFC) for the present connection. For each transport channel a set of transport formats (TF) is defined. The transport format defines the transport block size (TBS) and the transport block set size (TBSS) as dynamic attributes (that can change from TTI to TTI) and transmission time interval (TTI), error correction scheme (e.g., turbo code, code rate and rate matching attribute) and size of CRC as semi-static attributes (that are not changed from TTI to TTI and which can only be changed via radio link reconfiguration). A physical layer can multiplex several transport channels. The TFCS defines which TFCs are allowed, i.e., in practice, which are the allowed transport channel data rate combinations. Once TFC is selected (in the transmitter), the TFCI is a pointer which tells the selected TFC for the receiver.

In the prior art, the TFCI defines the number of information bits for each transport channel (TBS and TBSS). Together with the other transport format (e.g., rate matching) parameters defined by the TF to the UE and rules on how these are used are given in the specifications, the UE knows how many channel bits the total number of information bits in each transport format combination will be mapped to. In a similar way, the receiving node knows how to do the decoding—mapping the channel bits back to information bits—when it gets the TFCI in each frame along with the data.

If the HARQ (L1 retransmissions) protocol is used, there can be different redundancy versions in different retransmissions, which means that the TFCI, together with the rate matching parameters, will no longer necessarily mean a fixed mapping between a certain number of information bits and a certain number of channel bits. This is because the transport format of some other transport channel may change in the next frame, while the retransmission for this transport channel still continues. This means that the number of channel bits might have either increased or decreased for the transport channel for which the retransmission have not yet been completed. Thus there has to be either some new rules in the specifications, or some additional L1 signaling bits sent together with the retransmission, so that the receiving side knows how to decode it.

It has been proposed already in the 3GPP, that there are separate L1 signaling bits (6-8) which tell the number of information bits for that transport channel which uses HARQ.

Then the idea is that the receiving node can first calculate the number of channel bits reserved for a certain transport channel in a certain transport format combination with the help of TFCI and rate matching parameters, in the way as defined in the known rel99 protocol. Then, if the newly defined L1 signaling bits are informing the number of information bits in that frame for that transport channel, then the receiving node knows how to do the decoding, since the coding rate (including both turbo coding and rate matching) in the retransmission is then:

Coding rate = number of information bits per transport channel/number of channel bits per transport channel In HSDPA, 6 bits are used for telling the transport block size. These bits are sent on HS-SCCH (High Speed Shared Control Channel). If the modulation scheme and/or the number of channelization codes used is changed a lot for the retransmission, then it is not possible to tell the transport block size with these 6 bits. Therefore, in HSDPA, one 6 bit word (111111) is reserved to tell that transport block size is not given in this control message and instead the transport block size from an earlier transmission should be used.

One disadvantage of this approach is that it requires 6-8 bits, which represents a large overhead percentage of the transport channel.

SUMMARY OF INVENTION

In its broadest sense, the present invention provides a new and unique method and apparatus for providing signaling in a communication link between a sending device and a receiving node. The invention is characterized by the fact that the signaling contains a predetermined bit pattern that indicates whether control information in the current transmission can be used alone for decoding, or whether some part of the control information from an earlier transmission must also be used.

According to the present invention, a transport format combination indicator (TFCI) in the current transmission may contain the control information and/or the predetermined bit pattern. In one embodiment, the TFCI may contain one bit in the form of a TFCI flag indicating how to decode data blocks in a current data frame. Moreover, the predetermined bit pattern may consist of only one bit, although embodiments are envisioned in which there is more than one bit in a predetermined pattern, including a bit pattern of "00" or "11".

By way of example, the present invention is described in relation to the communication link being based on using a hybrid automatic repeat request (HARQ) protocol, although the scope of the invention is not intended to be limited to the same, as discussed below.

The signaling is used for decoding a transport channel being sent in such a communication link. Typically, the some part of the control information is from the earlier transmission of the same block. In one embodiment, a separate dedicated control channel would contain the predetermined bit pattern.

The present invention may be implemented in a communication link that is either an uplink or a downlink, and may be implemented in apparatus that may take the form of either a receiving node, a sending node, a system or some combination thereof. The system would typically be a communication system. For example, the sending node may be user equipment and the receiving node may be a node B in an uplink; or the sending node may be a Node B and the receiving node may be user equipment in a downlink.

In particular, the basic idea of the present invention is to inform with a predetermined bit pattern of only one bit ('TFCI flag') whether the current TFCI bits can be used alone for decoding the transport channel, using HARQ. If this one bit is logical "1", then it means that current TFCI can be used for decoding alone, i.e., that the number of information bits for this transport format equals the number that is defined also originally when the TFCI has been defined. Alternatively, if this one bit is logical "0", then it means that the receiving side has to assume the same number of information bits for this transport format as in the original or any earlier transmission where this bit was "1". Thus the number of information bits cannot be taken from the current TFCI, when doing the decoding. Thus, typically, in the original transmission, the bit is logical "1", in the retransmissions the bit is either logical "0" or "1".

In operation, the receiving node first reads the 'TFCI flag', i.e., the one bit that tells whether the TFCI can be used for decoding as such. If this one bit is logical "1", then the TFCI tells the rate matching (RM) parameters as shown in step 106 and the data can be decoded. Alternatively, if this one bit is logical "0", then the TFCI only tells the number of channel bits and the number of information bits are taken from an earlier transmission of the same packet. If no earlier transmission for that packet exist, then the data has to be discarded, since the RM parameters are not available. Depending on the implementation a NAK will or will not be sent. Alternatively, if an earlier transmission of the same packet exists, then the other RM parameters are taken from there and the data is decoded as shown. If the decoding is successful, an acknowledgement (ACK) can be sent by the receiving node; if not, a no-acknowledgement (NAK) can be sent by the receiving node and the RM parameters are stored.

As a person skilled in the art would appreciate, depending on the uplink channel structure, the TFCI flag can be sent on a separate E-DCH control channel or as part of the TFCI. If E-DCH(s) and DCH(s) may be time multiplexed on the same code channel, then also the separate E-DCH control channel would most probably be time multiplexed on the same code channel. This E-DCH control channel may be used to carry, e.g., the redundancy version, HARQ process id, and new data indicator in addition to the TFCI flag proposed here.

If the other HARQ control information is minimized (for instance, only one redundancy version, no explicit HARQ process id (e.g., by tying the process id to physical frame numbering)), then the TFCI flag of the present invention together with the new data indicator could be encoded and sent with the other TFCI information.

As an example, if there are 32 different TFCs (transport format combination) defined in the TFCS (transport format combination set), then this requires 5 bits. Since the TFCI word can contain a maximum of 10 bits, one bit may be used for NDI and one bit for the TFCI flag. Thus, the TFCI flag would be part of the TFCI and would tell whether the 5 'real' TFCI bits can be used as such for E-DCH decoding or is part of the RM parameters taken from earlier transmission of the same packet.

One important advantage of the present invention is the fact that it requires less bits for signalling, only 1 bit instead of 6-8 bits, and thus a smaller overhead percentage.

It is also important to note that if the receiving node has missed the first transmission(s), then if the flag is set to logical "0" in the current transmission to indicate that the current TFCI does not tell the number of information bits, then the number of information bits is not known at the receiving node and the decoding cannot be carried out. This may happen sometimes especially in soft handoff (SHO) but since the TFC is typically kept the same between retransmissions, this should not be a major problem.

As an example consider a case with two transport channels: DCH1 with (0 and) 64 kbit/s data rate, 40 ms TTI and rate matching attribute RM1=1.0 and E-DCH2 with 64 and 128 kbit/s, 10 ms TTI and rate matching attribute RM=0.7. Assume the following four TFCs:

TFC1: DCH1 (64) only, SF=16, Ndata=2400 bits
TFC2: E-DCH2 (64) only, SF=16, Ndata=2400 bits
TFC3: DCH1 (64) and E-DCH2 (64), SF=8, Ndata=4800 bits
TFC4: E-DCH (128) only, SF=8, Ndata=4800 bits Ndata gives the number of channel bits and depends on the spreading factor (SF).

DCH1 has TTI=40 ms, therefore, the transport block size TBS1=2560 bits. With 16 bit CRC and rate 1/3 turbo coding (12 bits trellis termination), the block becomes (3*(2560+16)+12)=7740 bits which is divided equally into four radio frames, 1935 bits to each. After this there is rate matching which repeats some bits (the amount depends on the TFC).

E-DCH2 has TTI=10 ms and the transport block size TBS2=640 bits. For 64 kbit/s (i.e., TFC2 and TFC3), one transport block is sent and for 128 kbit/s (TFC4), two transport blocks are sent. Therefore, the number of bits before rate matching for TFC2 and TFC3 is 1980 bits (=3*(640+16)+12) and for TFC4 3948 bits (=3*(640+16+ 640+16)+12).

With the given rate matching attributes, the number of information bits per TTI and number of channel bits per 10 ms radio frame for each TFC becomes:

|  | DCH1 | | E-DCH2 | |
| --- | --- | --- | --- | --- |
| TFC | Info bits/ TTI | Channel bits/ radio frame | Info bits/ TTI | Channel bits/ radio frame |
| TFC1 | 2560 | 2400 | 0 | 0 |
| TFC2 | 0 | 0 | 640 | 2400 |
| TFC3 | 2560 | 2796 | 640 | 2004 |
| TFC4 | 0 | 0 | 1280 | 4800 |

Let's assume that DCH1 is not transmitted in the current frame and a single transport block of E-DCH2 is transmitted. Then TFC2 is used and TFCI flag=1. The block can be decoded based on the current TFCI (which points to TFC2). Further, let's assume that this transport block is not correctly received (there are errors after decoding) and therefore, a retransmission is requested. When this E-DCH2 transport block is retransmitted, DCH1 is also active, and therefore, TFC3 is used. Now, the TFCI flag=1 again, since both TFC2 and TFC3 have the same number of information bits for E-DCH2. Thus the rate dematching, soft combining and decoding is possible by using the current TFCI only.

As another example, assume that TFC4 is used for the first transmission of two transport blocks of E-DCH2. TFCI flag=1 and normal rate dematching and turbo decoding is possible. When these blocks are retransmitted (assuming that there were errors after decoding), assume again that DCH1 is active and therefore TFC3 has to be used. Now the 1280 information bits have to be sent using 2004 channel bits, i.e., quite a lot of puncturing is needed. Now the TFCI flag=0 and the receiver knows, that it should define the number of channel bits based on the current TFCI (->2004 channel bits) and the number of info bits based on an earlier TFCI (->1280 info bits). With this information, it is possible to rate dematch, soft combine and decode the transport blocks.

It should be noted that in this example only DCH1 and E-DCH2 were shown for simplicity. In a real situation, typically at least some higher layer control channel (DCCH) should be included in the TFCs. Also, there could be (many) other transport channels.

The scope of the invention is also intended to include using other predetermined bit patterns, such as "00", "11", for signaling with more than one bit.

BRIEF DESCRIPTION OF THE DRAWING

The drawing, not drawn to scale, includes the following Figures:

FIG. 1A is a diagram of a wireless network having user equipment communicating with receiving nodes.

FIG. 1B is a diagram of an uplink dedicated channel structure that is known in the art and similar to the uplink channel shown in FIG. 1A.

FIG. 2 is a flowchart of steps of the transport format signalling according to the present invention.

FIG. 3 is a block diagram of user equipment according to the present invention.

FIG. 4 is a block diagram of a receiving node according to the present invention.

DETAILED DESCRIPTION OF INVENTION

FIG. 2: The Basic Steps

FIG. 2 shows a flow chart of steps generally indicated as 100 of a method for implementing one aspect of the present invention.

In step 102, a receiving node first reads the 'TFCI flag', i.e., the one bit that tells whether the TFCI can be used for decoding as such. In step 104, if this one bit is logical "1", then the TFCI tells the rate matching (RM) parameters as shown in step 106 and the data can be decoded as shown in step 107.

Alternatively, if this one bit is logical "0", then the TFCI only tells the number of channel bits and the number of information bits are taken from an earlier transmission of the same packet as shown in step 108. In step 110, if no earlier transmission for that packet exist, then the data has to be discarded as shown in step 112, since the RM parameters are not available. Depending on the implementation a no-acknowledgement (NAK) will or will not be sent. Alternatively, if an earlier transmission of the same packet exists, then the number of information bits is taken from the earlier transmission as shown in step 114 and the data is decoded as shown in the step 107.

If the decoding is successful in step 116, an acknowledgement (ACK) is sent by the receiving node in step 118; if not, a NAK is sent by the receiving node and the RM parameters are stored in step 120.

FIG. 3: Sending Node or Device

FIG. 3 shows a sending node or device generally indicated as 200 having an uplink/downlink dedicated channel transmission module 202 for providing signaling in a communication link between a sending node and a receiving node, such as in an uplink from user equipment UE (FIG. 1A) to nodes B1, B2 in FIG. 1A (see also element 300 in FIG. 4) using the hybrid automatic repeat request (HARQ) protocol. According to the present invention, the uplink/downlink dedicated channel transmission module 202 provides signaling that contains a predetermined bit pattern that indicates whether control information in the current transmission alone can be used for decoding, or whether some part of the control information from an earlier transmission must also be used.

In operation a transport format combination indicator (TFCI) in the current transmission contains the control information and/or the predetermined bit pattern. The TFCI contains one bit in the form of a TFCI flag indicating how to decode data blocks in a current data frame. In the preferred embodiment, the predetermined bit pattern consists of only one bit, although embodiments may be implemented according to the invention using more than one bit in a predetermined pattern, including a bit pattern of "00" or "11".

By way of example, the communication link is based on using a hybrid automatic repeat request (HARQ) protocol, although the scope of the invention is not intended to be limited to the same. Embodiments are envisioned using the present invention in one or more communication links using other protocols either now known or later developed in the future. In other words, the scope of the invention is not intended to be limited to any particular communication protocol.

The signaling is used for decoding a transport channel being sent in such a communication link. Typically, the some part of the control information is from the earlier transmission of the same block. In one embodiment, a separate dedicated control channel would contain the predetermined bit pattern.

The present invention may be implemented in a communication link that is either an uplink or a downlink, and may be implemented in apparatus that may take the form of either a receiving node, a sending node, a system or some combination thereof. The system would typically be a communication system.

Consistent with that shown in FIG. 1A, the sending node 200 (FIG. 3) may be user equipment and the receiving node 300 (FIG. 4) may be a node B in an uplink; or the sending node 200 (FIG. 3) may be a Node B and the receiving node 300 (FIG. 4) may be user equipment in a downlink. In the latter case, the sending node uplink/downlink dedicated channel transmission module 202 receives the signaling from the Node B and processes the same consistent with that described above.

In FIG. 3, the user equipment 200 also includes other user equipment modules 204 that are known in the art and do not form part of the overall invention. The present invention is shown and described herein to form part of known user equipment, including those used for a mobile phone or terminal. For example, the user equipment 200 may also include, but not limited to: a signal processor connected to a radio access network module (connected to an antenna), a display module, an audio module, a microphone, a read only memory (ROM or EPROM), a keyboard module, a random access memory, etc. The signal processor typically controls the basic operation of mobile terminal, the operation of which is known in the art. Moreover, the user equipment may also include many other circuit elements known in the art which are not shown or described herein, since they do not form part of the immediate invention.

FIG. 4: Receiving Node

FIG. 4 shows a receiving node generally indicated as 300 having an uplink/downlink dedicated channel receiving module 302 for receiving signaling in a communication link between a sending node 200 (FIG. 3) and the receiving node 300, such as an uplink from the user equipment UE to a node B using, for example, the hybrid automatic repeat request (HARQ) protocol. In operation, the uplink/downlink dedicated channel receiving module 302 receives the signaling that contains the predetermined bit pattern that indicates whether the transport format combination indicator (TFCI) in the current transmission alone can be used for decoding the transport channel, or whether some part of the control information from an earlier transmission must also be used.

As described above, the scope of the invention is intended to include the communication link being either an uplink or a downlink. Consistent with that shown in FIG. 1A, the sending node 200 (FIG. 3) may be user equipment and the receiving node 300 (FIG. 4) may be a node B in an uplink; or the sending node (FIG. 3) may be a Node B and the receiving node (FIG. 4) may be user equipment in a downlink. In the latter case, the receiving node uplink/downlink dedicated channel transmission module 302 receives the signaling from the Node B and processes the same consistent with that described above.

Moreover, the receiving node 300 also includes other receiving node modules 304, which are known in the art, do not form part of the overall invention and are thus not described in detail. The present invention is shown and described herein to form part of known receiving nodes, including those used for a known base stations.

Module Implementations

The sending node uplink/downlink dedicated channel transmission module 202 in FIG. 3 and the receiving node uplink/downlink dedicated channel receiving module 302 in FIG. 4, as well as any of the other modules described herein, may be implemented using hardware, software, or a combination thereof. In a typical software implementation, the uplink/downlink dedicated channel transmission module 202 and the uplink/downlink dedicated channel receiving module 302 would be a microprocessor-based architecture having a microprocessor, a random access memory (RAM), a read only memory (ROM), input/output devices and control, data and address buses connecting the same. A person skilled in the art of programming would be able to program such a microprocessor-based implementation to perform the functionality described herein without undue experimentation.

Computer Program and Products

The present invention also includes implementing the step of the method via a computer program running in a processing means in an uplink dedicated channel transmission module of the user equipment, as well as including a computer program product with a program code, which program code is stored on a machine readable carrier, for carrying out the steps according to FIG. 2, when the computer program is run in a suitable processing means in the uplink dedicated channel transmission module 202 of the sending node 200.

System

The scope of the invention is also intended to include a system, communication system or network in which the steps of the invention shown and described in FIG. 2 are implemented in relation to the cooperation of the sending node 200 shown in FIG. 3 and the receiving node 300 shown in FIG. 4.

Scope of the Invention

The scope of the invention is not intended to be limited to any specific kind of receiving node, user equipment, mobile terminal, phone or device, and many different mobile terminals or device, including laptop or notebook computers, are envisioned that may contain the fundamental features of the present invention described herein.

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It should be noted that alternatively the meaning of "1" and "0" could be swapped, i.e., "1" could mean that number of information bits should be taken from an earlier TFCI and "0" that current TFCI is valid and enough for decoding the E-DCH. Also, any other predefined bit patterns could be used instead of single bit flags.

It should also be noted that uplink has been used as an example here. The present invention can also be applied to downlink transmission where Node B is the transmitting side and UE the receiving side.

The TFCI flag could also be transmitted on a shared/common control channel in addition to dedicated control channel.

We claim:

1. A method of providing signaling in a communication link between a sending node and a receiving node, the method comprising:
   providing a current transmission, wherein the current transmission includes a predetermined bit pattern and current control information;
   if the current control information in the current transmission is to be used alone for decoding a transport channel, providing a first indication in the predetermined bit pattern that the current control information is to be used alone for decoding the transport channel; and
   if at least a portion of control information from an earlier transmission is to be used to decode the transport channel, providing a second indication in the predetermined bit pattern that the control information from the earlier transmission is to be used to decode the transport channel.

2. A method according to claim 1, wherein a transport format combination indicator (TFCI) in the current transmission contains the control information in the current transmission.

3. A method according to claim 1, wherein a transport format combination indicator (TFCI) in the current transmission contains the predetermined bit pattern.

4. A method according to claim 1, wherein the current transmission is provided using a hybrid automatic repeat request (HARQ) protocol.

5. A method according to claim 1, wherein the current transmission comprises a retransmission of the earlier transmission.

6. A method according to claim 1, wherein the sending node is user equipment and the receiving node is a node B in an uplink.

7. A method according to claim 1, Wherein the sending node is a Node B and the receiving node is user equipment in a downlink.

8. A method according to claim 1, wherein the predetermined bit pattern consists of one bit.

9. A method according to claim 1, wherein the predetermined bit pattern comprises a bit pattern of "00" or a bit pattern of "11".

10. A method according to claim 3, wherein the TFCI includes one bit comprising a TFCI flag indicating how to decode data blocks in a current data frame.

11. A method according to claim 1, wherein a separate dedicated control channel contains the predetermined bit pattern.

12. A method according to claim 8, wherein if the one bit is a logical "1", the receiving node uses a transport format combination indicator (TFCI) in the current transmission for decoding, wherein a number of information bits for a transport format of the current transmission equals a number of information bits for a transport format defined in the earlier transmission.

13. A method according to claim 8, wherein if the one bit is a logical "0," using a number of channel bits from a transport format combination indicator (TFCI) in the current transmission for the decoding, and using a number of information bits from the earlier transmission for the decoding.

14. A method according to claim 13, wherein the current transmission is discarded if there is no earlier transmission.

15. A method according to claim 1, wherein an acknowledgement (ACK) is sent if the decoding is successful.

16. A method according to claim 1, wherein a no-acknowledgement (NAK) is sent if the decoding is unsuccessful.

17. A method according to claim 10, further comprising:
   reading the TFCI flag; and
   if the TFCI flag is equal to a logical "1", using rate matching (RM) parameters from the TFCI for decoding data in the transport channel.

18. A method according to claim 17, further comprising sending an acknowledgement (ACK) if the decoding is successful.

19. A method according to claim 17, further comprising sending a no-acknowledgement (NAK) if the decoding is not successful and storing the rate matching (RM) parameters.

20. A method according to claim 10, further comprising:
   if the TFCI flag is equal to a logical "0", using a number of channel bits from the current transmission for the decoding;
   if the earlier transmission is available using a number of information bits from the earlier transmission for the decoding; and
   if the earlier transmission is not available, discarding the current transmission and sending a non-acknowledgement.

21. A method according to claim 1, wherein the current transmission is provided via a computer program running in a processing means in an uplink/downlink dedicated channel transmission module of either the sending node or the receiving node.

22. A computer-readable medium having computer-readable instructions stored thereon that, upon execution by a processor, cause the processor to:
   provide a current transmission in a communication link between a sending node and a receiving node, wherein the current transmission includes a predetermined bit pattern and current control information;
   if the current control information in the current transmission is to be used alone for decoding a transport channel, provide a first indication in the predetermined bit pattern that the current control information is to be used alone for decoding the transport channel; and
   if at least a portion of control information from an earlier transmission is to be used to decode the transport channel, provide a second indication in the predetermined bit pattern that the control information from the earlier transmission is to be used to decode the transport channel.

23. A method according to claim 1, wherein the sending node and the receiving node form part of a wireless network.

24. A receiving node for receiving signaling in a communication link with a sending node, comprising:

a receiving module configured to
receive a current transmission, wherein the current transmission includes a predetermined bit pattern and current control information;
if the current control information in the current transmission is to be used alone for decoding a transport channel, receive a first indication in the predetermined bit pattern that the current control information is to be used alone for decoding the transport channel; and
if at least a portion of control information from an earlier transmission is to be used to decode the transport channel, receive a second indication in the predetermined bit pattern that the control information from the earlier transmission is to be used to decode the transport channel.

25. A receiving node according to claim 24, wherein a transport format combination indicator (TFCI) in the current transmission contains the control information in the current transmission.

26. A receiving node method according to claim 24, wherein a transport format combination indicator (TFCI) in the current transmission contains the predetermined bit pattern.

27. A receiving node according to claim 24, wherein the communication link is based on using a hybrid automatic repeat request (HARQ) protocol.

28. A receiving node according to claim 24, wherein the current transmission comprises a retransmission of the earlier transmission.

29. A receiving node according to claim 24, wherein the signaling is used for decoding a transport channel being sent in the communications link.

30. A receiving node according to claim 24, wherein the communication link is an uplink or a downlink.

31. A receiving node according to claim 24, wherein the sending node is user equipment and the receiving node is a node B in an uplink.

32. A receiving node according to claim 24, wherein the sending node is a Node B and the receiving node is user equipment in a downlink.

33. A receiving node according to claim 24, wherein the predetermined bit pattern consists of only one bit.

34. A receiving node according to claim 24, wherein the predetermined bit pattern comprises a bit pattern of "00" or "11".

35. A sending node for providing signaling in a communication link with a receiving node, comprising:
a transmission module configured to
send a current transmission, wherein the current transmission includes a predetermined bit pattern and current control information;
if the current control information in the current transmission is to be used alone for decoding a transport channel, provide a first indication in the predetermined bit pattern that the current control information is to be used alone for the transport channel; and
if at least a portion of control information from an earlier transmission is to be used to decode the transport channel, provide a second indication in the predetermined bit pattern that the control information from the earlier transmission is to be used to decode the transport channel.

36. A sending node according to claim 35, wherein a transport format combination indicator (TFCI) in the current transmission contains the control information in the current transmission.

37. A sending node method according to claim 35, wherein a transport format combination indicator (TFCI) in the current transmission contains the predetermined bit pattern.

38. A sending node according to claim 35, wherein the communication link is based on using a hybrid automatic repeat request (HARQ) protocol.

39. A sending node according to claim 35, wherein the current transmission comprises a retransmission of the earlier transmission.

40. A sending node according to claim 35, wherein the signaling is used for decoding a transport channel being sent in the communications link.

41. A sending node according to claim 35, wherein the communication link is an uplink or a downlink.

42. A sending node according to claim 35, wherein the sending node is user equipment and the receiving node is a node B in an uplink.

43. A sending node according to claim 35, wherein the sending node is a Node B and the receiving node is user equipment in a downlink.

44. A sending node according to claim 35, wherein the predetermined bit pattern consists of only one bit.

45. A sending node according to claim 35, wherein the predetermined bit pattern comprises a bit pattern of "00" or "11".

46. A system for providing signaling in a communication link, the system comprising:
a sending node comprising a transmission module configured to transmit a current transmission; and
a receiving node comprising a receiving module configured to receive the current transmission from the sending node, wherein
the current transmission includes a predetermined bit pattern and current control information;
wherein if the current control information in the current transmission is to be used alone for decoding a transport channel, a first indication in the predetermined bit pattern indicates that the current control information is to be used alone for decoding the transport channel; and
wherein if at least a portion of control information from an earlier transmission is to be used to decode the transport channel, a second indication in the predetermined bit pattern indicates that the control information from the earlier transmission is to be used to decode the transport channel.

47. A system according to claim 46, wherein a transport format combination indicator (TFCI) in the current transmission contains the control information in the current transmission.

48. A system method according to claim 46, wherein a transport format combination indicator (TFCI) in the current transmission contains the predetermined bit pattern.

49. A system according to claim 46, wherein the communication link is based on using a hybrid automatic repeat request (HARQ) protocol.

50. A system according to claim 46, wherein the current transmission comprises a retransmission of the earlier transmission.

51. A system according to claim 46, wherein the decoding comprises decoding a transport channel.

52. A system according to claim 46, wherein the communication link is an uplink or a downlink.

53. A system according to claim 46, wherein the sending node is user equipment and the receiving node is a node B in an uplink.

54. A system according to claim 46, wherein the sending node is a Node B and the receiving node is user equipment in a downlink.

55. A system according to claim 46, wherein the predetermined bit pattern consists of only one bit.

56. A system according to claim 46, wherein the predetermined bit pattern comprises a bit pattern of "00" or "11".

57. A system according to claim 46, wherein the system is a communication system.

* * * * *